J. HADKA.
AUTOMOBILE FENDER.
APPLICATION FILED JULY 12, 1912.

1,062,705.

Patented May 27, 1913.

Witnesses:
J. C. Devick.
Earl C. Carlson.

Inventor:
Joseph Hadka.
By Luther L. Miller
Atty.

UNITED STATES PATENT OFFICE.

JOSEPH HADKA, OF CHICAGO, ILLINOIS.

AUTOMOBILE-FENDER.

1,062,705.   Specification of Letters Patent.   Patented May 27, 1913.

Application filed July 12, 1912. Serial No. 709,001.

*To all whom it may concern:*

Be it known that I, JOSEPH HADKA, a citizen of the United States, residing at Chicago, in the county of Cook and State of Illinois, have invented certain new and useful Improvements in Automobile-Fenders, of which the following is a specification.

One of the objects of my invention is to produce an automobile fender simple and efficient in its operation, cheap of manufacture and strong and durable in its construction.

A further object is to provide a simple form of automobile fender capable of being securely and easily attached by the owner of the car without assistance of a skilled mechanic, and without the use of special machinery or tools, thus avoiding the necessity of sending the car to the shop and saving the time and expense that would thereby be required.

A further object of my invention is to enable the fender to be easily and quickly detached when it is not required.

A further object is to avoid the necessity for the drilling or boring of additional holes in any part of the framework of the car, which would necessarily tend to weaken that part. By the use of the improvements hereinafter described I avoid that difficulty by utilizing the bolts which are already in place in the car.

While my invention may be adapted for use with a variety of cars, the form herein described is especially constructed for use with those cars which, like the Brush automobile, are built with a horizontal bar which supports the radiator, and bears on each side of the radiator a lamp bracket bolted to the said bar.

My invention is illustrated in the accompanying drawings in which—

Figure 1:
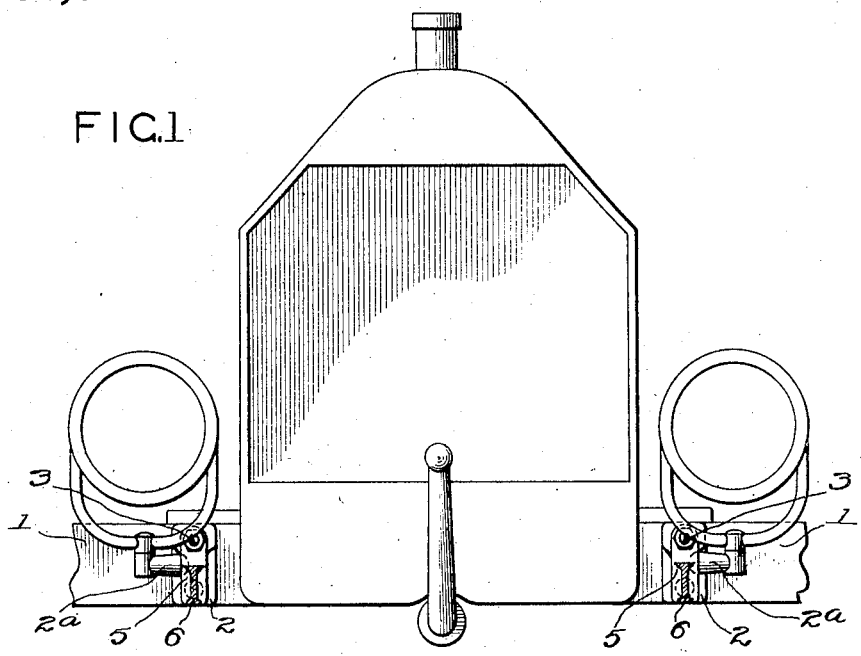
Figure 2:
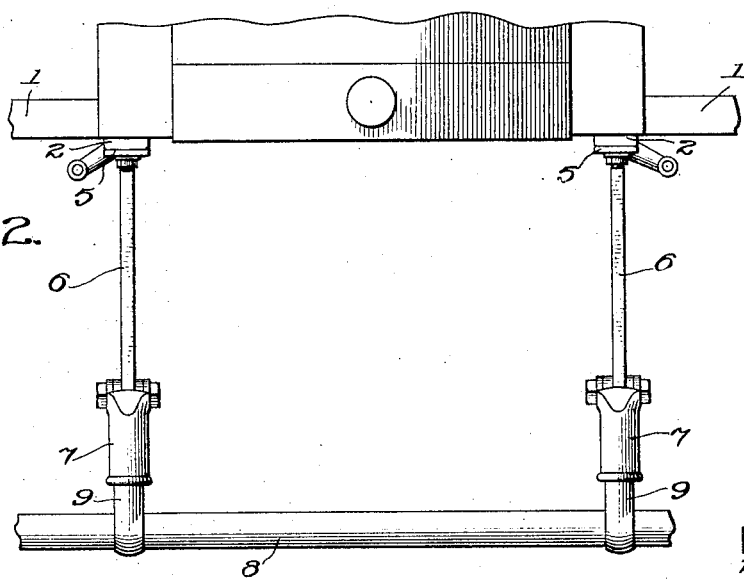
Figure 4:
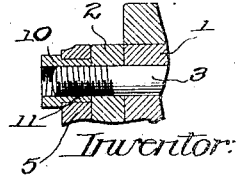
Figure 3:
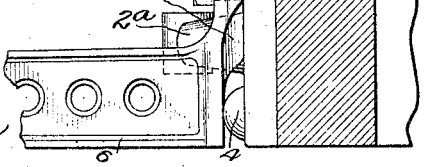

Figure 1 is a fragmental front elevation of a Brush automobile, showing portions of my fender bracket in place. Fig. 2 is a fragmental top plan view. Fig. 3 is a detail view, partly sectional, showing the end of the fender bracket attached to the cross bar of the automobile chassis by means of the lamp bracket bolt. Fig. 4 is a detail sectional view showing the use of the special nut required to make the attachment shown in Fig. 3.

In a car of the construction referred to, there is a horizontal cross bar 1 which forms a part of the chasis and supports the radiator and which carries at each side of the radiator a lamp bracket which is secured to the bar 1 by the bolts 3 and 4 passing through the bar 1 and the plate 2 of the lamp bracket. The bolt 3 projects in front of the bracket plate 2 just sufficiently far to admit of securing it by means of an ordinary nut.

The parts thus far described are found in the automobile as it comes from the factory. The fender which I have invented for attachment to a car of this construction is shown in position in Fig. 2, and consists of short vertical bracket arms 5, horizontal bracket arms 6, chambered extension members 7, an impact bar 8 and members 9 which connect the impact bar with the extension members 7.

The extension members 7 are connected to the bracket bar 6 by any suitable means and are chambered for the reception of a spring. While any suitable means may be employed to connect the impact bar with these chambered extension members, I prefer the construction set forth in my U. S. Letters Patent 1,026,981, issued May 21, 1912.

As the automobile comes to the purchaser, the bolt 3 is designed only to hold in place the lamp bracket plate 2, and it is manifest that it would be too short to pass through the additional thickness of the bracket arm 5 and protrude far enough to be engaged by a nut of the ordinary construction. In order to secure the bracket arm 5 to this bolt, the nut, which necessarily engages the thread of the bolt at the same place as does the ordinary nut, must extend into the interior of the bracket arm 5 and be provided also with means of engaging the exterior surface of such arm at or beyond the end of the bolt. I have therefore provided a specially designed nut having a shoulder 10 and an extended depressed collar 11, screw-threaded throughout and of proper interior diameter to engage the thread of the bolt 3. The exterior diameter of the collar 11 is approximately the same as the diameter of a corresponding aperture in the vertical bracket arm 5, as shown in Fig. 4.

The bracket arm 5 is recessed or cut away in its lower part to avoid the head of the bolt 4, as shown in Fig. 3. Above the bolt 4 and below the bolt 3 the rear portion of the bracket arm 5 is beveled, as shown at 5<sup>a</sup> in Fig. 3, for the purpose of avoiding the arm 2ᵃ of the lamp bracket. This lamp bracket is on but one side of the fender arm; but in order to render the parts interchangeable I bevel the bracket arm on both sides so that the same arm may be used on the right or left side of the automobile.

To attach this improved fender to an automobile of the construction described it is only necessary to remove the ordinary nut from the end of the bolt securing the lamp bracket plate 2, place the fender bracket arm 5 in position over the end of said bolt and apply and tighten the special nut, as described. The whole operation requires but a moment and can be performed by anyone with the ordinary wrench found in the tool box.

When the fender is positioned and the nut has been tightened, the lower portion of the vertical bracket arm 5 bears against the head of the bolt 4, as shown in Fig. 3, thus giving strength and rigidity to the bracket connection.

I do not desire to limit myself to the precise forms herein shown, since the proportions, form and manner of construction may be varied without departing from the spirit and substance of my invention.

What I claim as new and desire to secure by Letters Patent is:

1. In an automobile fender, a securing bolt, a supporting member having an arm containing an aperture for the reception of the threaded end of such bolt, and a shouldered nut adapted to engage the thread of such bolt in said aperture.

2. In an automobile fender, a bracket arm containing an aperture for the reception of a bolt and a screw-threaded nut having a shoulder adapted to bear against the surface of said arm and a depressed extended collar adapted to engage the thread of a bolt within said aperture.

In testimony whereof I have hereunto affixed my signature in the presence of two witnesses.

JOSEPH HADKA.

Witnesses:
 F. J. HIEJSA,
 ED. VOTAVA.

---

Copies of this patent may be obtained for five cents each, by addressing the "Commissioner of Patents, Washington, D. C."